Patented Apr. 4, 1950

2,502,782

UNITED STATES PATENT OFFICE 2,502,782

METHOD OF COATING PAPER

Donald Robert Erickson, Kalamazoo, Mich.

No Drawing. Application November 17, 1949, Serial No. 127,989. In Canada March 10, 1947

2 Claims. (Cl. 117—62)

This application is a continuation-in-part of my application Serial No. 632,278, filed December 1, 1945, now abandoned, for Method of coating paper.

This invention relates to paper and the method of sizing the same and imparting to it qualities of grease, oil and organic solvent resistance.

One object is to provide a new and improved method of producing an oil, grease, organic solvent and aromatic odor and gas impenetrable paper.

Another object is to provide such a method which is simple, effective and inexpensive.

Another object is to provide a new and improved paper of the class above referred to.

Another object is to provide such a paper that is highly flexible, uniform, and stable to aging.

In carrying out the invention, a suitable paper base is chosen. This base will usually be paper but it may be vegetable parchment or a paper board suitable for making cartons or the like and as here employed the term "paper" is intended to cover all such materials.

The paper is formed in the usual way, on a paper machine, and thereafter is treated with the sizing or coating material. This material is a hydroxy alkyl cellulose such as hydroxy ethyl cellulose or hydroxy propyl cellulose which is insoluble in water but is soluble in a solution of sodium hydroxide in water. The hydroxy ethyl cellulose is the preferred hydroxy alkyl cellulose since it gives the most satisfactory results and product. The preferred hydroxy alkyl cellulose is one soluble in a five per cent by weight sodium hydroxide in water solution, although very desirable results are obtained with hydroxy alkyl cellulose soluble in a solution of from three to five per cent by weight of sodium hydroxide in water. Such hydroxy alkyl celluloses will have more than one and not more than four cellulose units combined with an ethylene oxide radical.

The hydroxy alkyl cellulose is dissolved in the sodium hydroxide solution to form a viscous material which is applied to the paper by means of any suitable coating means such as a tub. a brush coater, a roll coater, a meniscous coater, an extruder, an air brush coater, or a gravure or letter press type. The material is applied to form a continuous coating on the surface of the paper.

Immediately after the hydroxy alkyl cellulose solution is applied to the paper, the hydroxy alkyl cellulose is precipitated from its solution by eliminating the sodium hydroxide from solution and converting its hydroxyl ion into water. This is done by an ion interchange between the sodium hydroxide and a water-soluble compound which has an ion which is reactive with the sodium ion of the sodium hydroxide to form a soluble sodium salt, and which also has an ion which is reactive with the hydroxyl ion of the sodium hydroxide, and which compound is selected from the group consisting of water-soluble acids, acid salts, and ammonium salts. The ion which is reactive with the hydroxyl ion is thus a hydrogen ion which produces water directly, or an ammonium ion which eventually converts the hydroxyl ion to water, since the end products of the conversion are ammonia and water.

This step of the elimination of the sodium hydroxide from the solution and converting its hydroxyl ion to water is carried out immediately by contacting the coating with a water solution of the compound. This may be done by immersing the sheet in a water solution of the compound. The immersion should be sufficiently long for the ion interchange to take place between the sodium hydroxide and the compound, which will bring about the precipitation of the hydroxy alkyl cellulose.

The coating is contacted immediately with the solution before there has been any appreciable drying or penetration into the paper base. This maintains a continuous coating on the surface of the paper.

When the coating is subjected to the solution of the compound which eliminates the sodium hydroxide, an ion interchange takes place. The sodium ion and the salt-forming ion of the compound react to form a sodium salt. The ion of the compound which is reactive with the hydroxyl ion reacts either to directly form water or to eventually form water, as will be described later.

The elimination of the sodium hydroxide as such from the solution prevents any material deterioration of the paper, which would result from the action of a caustic. Suitable compounds for eliminating sodium hydroxide from the solution and converting its hydroxyl ion to water and which results in the precipitation of the hydroxy alkyl cellulose are water-soluble acid salts and water-soluble acids. Weak acids, and preferably weak, organic acids, may be used. If weak, organic acids are employed, they will not harm the paper. If stronger acids are employed, extreme care should be taken that no acid residue is left after the elimination of the sodium hydroxide. In practical use such care may not be feasible. It is possible also to use ammonium salts which react with the sodium hydroxide to eliminate it from the solution and thus precipitate the hydroxy alkyl cellulose. These salts have an ion which reacts with the sodium ions in the solution to form a soluble sodium salt. The ammonium ion reacts with the hydroxyl ion and the hydroxyl ion is converted to water when the ammonia gas is eliminated from the coating. This will occur quite promptly at room temperature or may occur on standing or heating.

Suitable compounds falling within the above designation are monosodium phosphate, disodium phosphate, sodium bisulphate, and sodium bicarbonate. Suitable water-soluble, weak, organic acids include: acetic acid, citric acid, lactic acid, tartaric acid, maleic acid, and oxalic acid. Strong acids, such as sulphuric acid, or hydrochloric acid, give a satisfactory product when care is taken to see that there is no acid residue left after the elimination of the sodium hydroxide from the solution and the precipitation of the hydroxy alkyl cellulose. Suitable ammonium compounds include ammonium sulphate, ammonium chloride, and ammonium carbonate. When these compounds are used the ammonium ion reacts with the hydroxyl ion of the sodium hydroxide, and the ammonia is thereafter eliminated, either by heating or by standing. Ammonium carbonate is not as practical as the other ammonium salts because of its property of disintegrating at room temperature to give off ammonia.

All of the above substances may be used if the compound which reacts with and eliminates the sodium hydroxide from the solution is applied in solutions having between 20 and 30 per cent by weight of the compound. A less concentrated solution can be employed, and, of course, must be employed for substances having less than this much solubility. The treatment may be conducted at a temperature of from 150° F. to 200° F., which, however, is not essential.

The precipitated hydroxy alkyl cellulose is in a swelled form but is not tacky and the paper, after a water wash and a pass through squeeze rolls, may be passed to a dryer such as one having heated rolls where it is dried. The rolls of the dryer will press the hydroxy alkyl cellulose and it can be given any desired finish by the rolls if it has been applied heavily enough to form a continuous film. The drying is much more expeditious in using this process than in the usual process aimed at the same objectives with the obvious resulting economy. The paper is immediately immersed in a bath of 20 per cent to 30 per cent by weight ammonium sulphate or any of the other compounds above mentioned at 150° F. to 200° F. A fractional part of a second in this bath will permit the ion interchange above mentioned to take place after which the sheet is washed in hot water to remove the sodium salts. The amount of the viscous solution applied will control the time of immersion in this bath needed to allow the ion interchange to take place, but in cases of simple sizing such as the above, the time specified will bring about the desired results.

In place of the hydroxy ethyl cellulose, other hydroxy alkyl celluloses such as hydroxy propyl cellulose can be employed.

In making a paper which is impervious to oil, grease, organic solvents and aromatic odors or gases, enough of the hydroxy alkyl cellulose in sodium hydroxide solution is employed to form a continuous coating on the paper base. A typical example would involve the use of eight parts by weight of hydroxy ethyl cellulose, hydroxy propyl cellulose or other hydroxy alkyl cellulose having the desired properties dissolved in one hundred parts of six per cent by weight sodium hydroxide in water solution. The coating would be heavy and continuous and after application the sheet would be heated in a bath such as that described above and at the same temperature to let the ion interchange take place. The time involved for ion interchange to take place will depend upon the thickness of the coating.

A paper made this way would be impervious to oil, grease, organic solvents and aromatic odors and gases. It would be flexible and would resist the normal degradation of aging. It would be suitable for butter or lard wrappers, cartons, paper plates and cups and for many other uses. The papers made as above described are superior to other papers now made for uses such as these papers are designed for and the methods of making them are simple, inexpensive and sure in operation.

It is to be understood that widely different embodiments of this invention may be made without departing from the spirit and scope thereof, and that there is no intention to limit it to the specific embodiments thereof described above except as defined in the claims.

I claim:

1. The method of producing paper impervious to oil, grease, organic solvents, aromatic odors and gases comprising completely covering the face of a paper base with a continuous viscous coating consisting essentially of hydroxy ethyl cellulose insoluble in water but soluble in aqueous sodium hydroxide dissolved in a water solution of sodium hydroxide and immediately forming a continuous film of said hydroxy ethyl cellulose on and fixed to the surface of and completely covering said paper base by immediately eliminating the sodium hydroxide from the solution by ion interchange and thereby precipitating said hydroxy ethyl cellulose from solution by subjecting said viscous coating immediately to contact with a water solution of an ammonium salt to effect an ion interchange between the sodium hydroxide and the ammonium salt.

2. The method of producing paper impervious to oil, grease, organic solvents, aromatic odors and gases comprising completely covering the face of a paper base with a continuous viscous coating consisting essentially of hydroxy ethyl cellulose insoluble in water but soluble in aqueous sodium hydroxide dissolved in a water solution of sodium hydroxide and immediately forming a continuous film of said hydroxy ethyl cellulose on and fixed to the surface of and completely covering said paper base by immediately eliminating the sodium hydroxide from the solution and converting its hydroxyl ion to water by ion interchange and thereby precipitating said hydroxy ethyl cellulose from solution by immediately contacting said coating with a water solution of a water-soluble compound having an ion reactive with the sodium ion of said sodium hydroxide to form a water-soluble sodium salt and an ion reactive with the hydroxyl ion of said sodium hydroxide, said compound being selected from the group consisting of water-soluble acids, alkali metal acid salts, and ammonium salts.

DONALD ROBERT ERICKSON.

REFERENCES CITED

The following references are of record in the file of this patent:

UNITED STATES PATENTS

| Number | Name | Date |
|---|---|---|
| 2,033,481 | Richter | Mar. 10, 1936 |
| 2,087,237 | Bolton | July 20, 1937 |
| 2,235,798 | Collings et al. | Mar. 18, 1941 |
| 2,265,916 | Lilienfeld | Dec. 9, 1941 |
| 2,314,217 | Hurd | Mar. 15, 1943 |
| 2,327,912 | Lilienfeld | Aug. 24, 1943 |
| 2,390,780 | Cornwell | Dec. 11, 1945 |